United States Patent
Yamada et al.

(10) Patent No.: US 8,421,396 B2
(45) Date of Patent: Apr. 16, 2013

(54) MOTOR CONTROLLING DEVICE

(75) Inventors: Jun Yamada, Nagoya (JP); Shigeru Kamio, Nagoya (JP); Kiyoshi Kimura, Kariya (JP)

(73) Assignee: Denso Corporation, Kariya (JP)

( * ) Notice: Subject to any disclaimer, the term of this patent is extended or adjusted under 35 U.S.C. 154(b) by 228 days.

(21) Appl. No.: 12/987,299

(22) Filed: Jan. 10, 2011

(65) Prior Publication Data

US 2011/0175563 A1    Jul. 21, 2011

(30) Foreign Application Priority Data

Jan. 20, 2010    (JP) .................................. 2010-10512

(51) Int. Cl.
*H02P 25/00* (2006.01)
*H02P 25/08* (2006.01)

(52) U.S. Cl.
USPC ........ 318/721; 318/427; 318/254.1; 318/266; 318/701

(58) Field of Classification Search .................. 318/701, 318/254.1, 266, 466, 430–432, 568, 561, 318/685, 400.11, 437, 721
See application file for complete search history.

(56) References Cited

U.S. PATENT DOCUMENTS

| | | | | |
|---|---|---|---|---|
| 6,043,483 | A * | 3/2000 | Schreiber ................. | 250/231.13 |
| 7,084,597 | B2 * | 8/2006 | Nakai et al. ................ | 318/254.1 |
| 7,221,116 | B2 * | 5/2007 | Nakai et al. .................... | 318/266 |
| 7,312,595 | B2 * | 12/2007 | Kamio et al. ................... | 318/701 |
| 7,339,342 | B2 * | 3/2008 | Harada et al. ................. | 318/685 |
| 7,609,012 | B2 * | 10/2009 | Kamio et al. ................. | 318/266 |
| 7,667,427 | B2 * | 2/2010 | Kamio et al. ................. | 318/701 |
| 7,990,088 | B2 * | 8/2011 | Isobe et al. ............... | 318/400.11 |
| 8,134,322 | B2 * | 3/2012 | Nakai et al. .................... | 318/437 |
| 2003/0222617 | A1 * | 12/2003 | Nakai et al. .................... | 318/701 |
| 2004/0008002 | A1 * | 1/2004 | Kamio et al. ................. | 318/701 |
| 2006/0033464 | A1 * | 2/2006 | Nakai et al. .................... | 318/701 |
| 2006/0108966 | A1 * | 5/2006 | Kamio et al. ................. | 318/701 |
| 2006/0197489 | A1 * | 9/2006 | Nakai et al. .................... | 318/701 |
| 2007/0182353 | A1 * | 8/2007 | Kamio et al. ................. | 318/466 |
| 2008/0025663 | A1 | 1/2008 | Yao et al. | |
| 2008/0037164 | A1 * | 2/2008 | Oh et al. ..................... | 360/99.08 |
| 2009/0108791 | A1 * | 4/2009 | Isobe et al. .................... | 318/561 |
| 2009/0193923 | A1 * | 8/2009 | Nakai et al. ................. | 74/473.12 |
| 2011/0068730 | A1 * | 3/2011 | Nakai et al. .................... | 318/563 |

FOREIGN PATENT DOCUMENTS

| | | |
|---|---|---|
| JP | 6-54576 | 2/1994 |
| JP | 6-247324 | 9/1994 |
| JP | 11-187684 | 7/1999 |
| JP | P2002-362393 A | 12/2002 |
| JP | P2003-289694 A | 10/2003 |

OTHER PUBLICATIONS

Japanese Office Action dated Dec. 2, 2011, issued in corresponding Japanese Application No. 2010-010512 with English Translation.

* cited by examiner

*Primary Examiner* — Paul Ip
(74) *Attorney, Agent, or Firm* — Nixon & Vanderhye P.C.

(57) ABSTRACT

A motor controlling device includes an encoder to output pulse signals with a predetermined angle interval as a rotor of a motor is rotated. An energized phase of the motor is sequentially switched by detecting a rotation position of the rotor based on a value of counting the signals. An initial drive controlling portion executes an initial drive to switch the energized phase with a predetermined pattern after the device is activated so as to learn a relationship among the count value, the rotation position and the energized phase. An initial drive prohibiting portion prohibits the execution of the initial drive until a predetermined time is elapsed after the initial drive is finished.

9 Claims, 9 Drawing Sheets

MOTOR CONTROLLING DEVICE

CROSS REFERENCE TO RELATED APPLICATION

This application is based on Japanese Patent Application No. 2010-10512 filed on Jan. 20, 2010, the disclosure of which is incorporated herein by reference in its entirety.

BACKGROUND OF THE INVENTION

1. Field of the Invention

The present invention relates to a motor controlling device.

2. Description of Related Art

A brushless switched reluctance motor in increasing demand has simple structure and low price. The motor has an encoder to output pulse signals synchronizing with a rotor rotation. A number of the output signals output from the encoder are counted, and a rotor rotation position is detected based on the count value. A rotor of the motor is driven by sequentially switching energized phase based on the detection.

This kind of motor with the encoder only detects a rotation angle amount from a start position of the rotor based on the count value of the encoder. JP-A-2004-15849 discloses a motor, and an energized phase of the motor is sequentially changed with a predetermined time schedule during an initial drive after the motor is activated. While a rotor of the motor is rotated, the energized phase is made correspond to a rotation position of the rotor, and signals output from an encoder in a predetermined angle interval are counted. A relationship among the count value of the encoder, the rotation position of the rotor and the energized phase of the motor is learned when the initial drive is ended. In a subsequent usual drive mode after the initial drive, the energized phase is set based on the count value of the encoder and the learned relationship.

It is necessary to continue power supplying for the motor during the initial drive, so that heat is generated from the motor. The initial drive is usually performed only once, because the motor is not turned off for a while after the activation. However, if a user repeatedly turns on and off the motor by intension for fun, the initial drive is repeatedly performed. In this case, the motor may be damaged, or a life of the motor may become short, because a temperature of the motor is unexpectedly raised.

SUMMARY OF THE INVENTION

In view of the foregoing and other problems, it is an object of the present invention to provide a motor controlling device.

According to a first example of the present invention, a motor controlling device includes a motor having a rotor, an encoder, an initial drive controlling portion and an initial drive prohibiting portion. The encoder outputs pulse signals with a predetermined angle interval as the rotor is rotated. An energized phase of the motor is sequentially switched by detecting a rotation position of the rotor based on a value of counting the signals output from the encoder so as to drive the rotor. The initial drive controlling portion executes an initial drive to switch the energized phase with a predetermined pattern after the motor is activated so as to learn a relationship among the count value, the rotation position and the energized phase. The initial drive prohibiting portion prohibits the execution of the initial drive until a predetermined prohibition time is elapsed after the initial drive is finished.

According to a second example of the present invention, a motor controlling device includes a motor having a rotor, an encoder, an initial drive controlling portion and a power source controlling portion. The encoder outputs pulse signals with a predetermined angle interval as the rotor is rotated. An energized phase of the motor is sequentially switched by detecting a rotation position of the rotor based on a value of counting the signals output from the encoder so as to drive the rotor. The initial drive controlling portion executes an initial drive to switch the energized phase with a predetermined pattern after the motor is activated so as to learn a relationship among the count value, the rotation position and the energized phase. The power source controlling portion continues power supplying for the motor until a predetermined time is elapsed if an operation for stopping the power supplying is performed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A motor controlling device is used in a range switch device of an automatic shift, for example, in a first embodiment.

Figure 1:
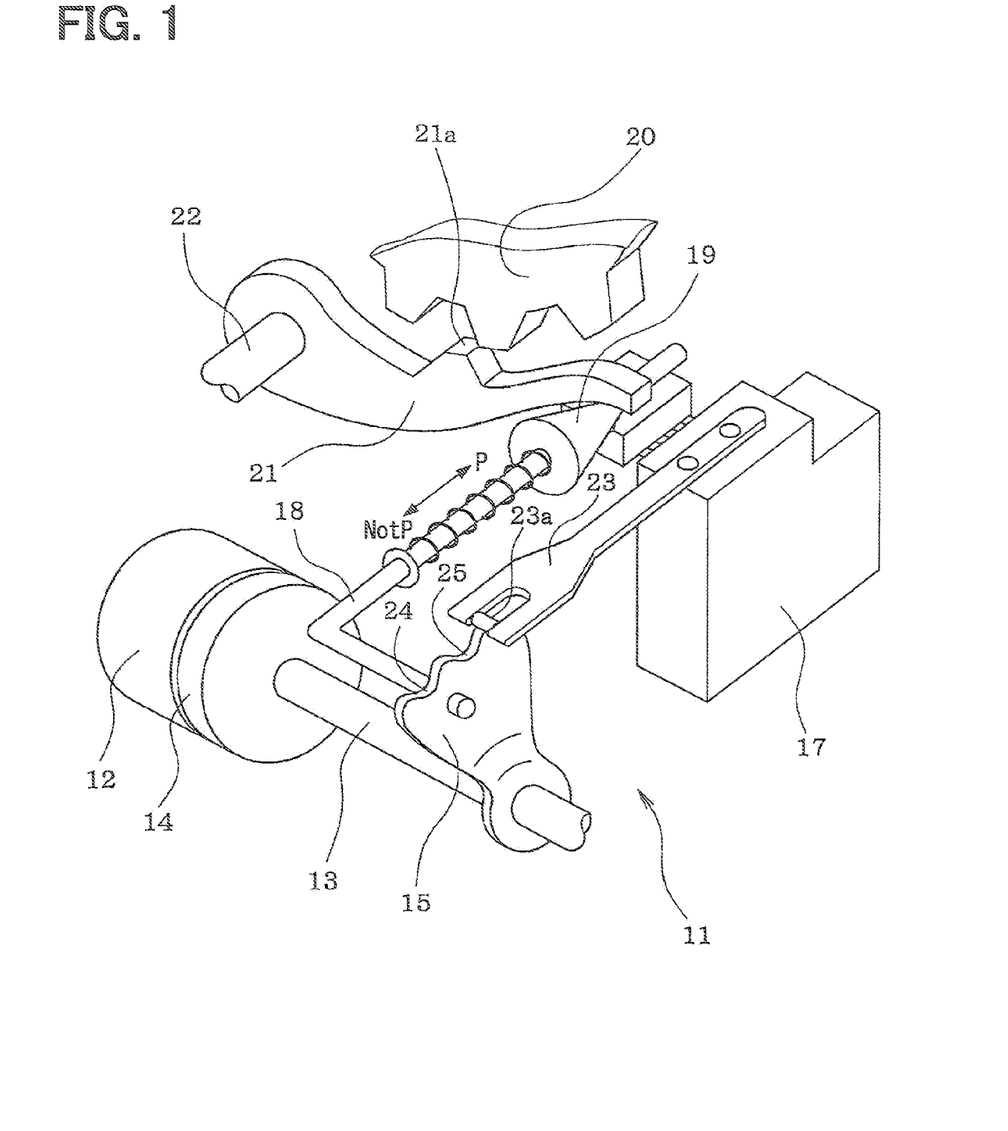
FIG. 1 is a perspective view illustrating a range switch device according to a first embodiment.

The first embodiment will be explained with reference to FIGS. 1-9. As shown in FIG. 1, a range switch mechanism 11 includes a switched reluctance motor 12 as a drive source, for example. The motor 12 includes a decelerator mechanism 26 of FIG. 4, an output shaft 13, and an output shaft sensor 14 to detect a rotation position of the output shaft 13. A detent lever 15 is fixed to the output shaft 13.

An L-shaped parking rod 18 is fixed to the detent lever 15, and an end of the rod 18 has a cone 19 contact with a lock lever 21. The lock lever 21 is moved up or down relative to a center axis 22 based on a position of the cone 19, thereby a parking gear 20 is locked or unlocked. The parking gear 20 is arranged on an output shaft of an automatic shift 27 of FIG. 4. When the parking gear 20 is locked by the lock lever 21, a driving wheel of a vehicle is maintained to stop, so that the vehicle has a park state.

A detent spring 23 is fixed to a support base 17 so as to maintain the detent lever 15 in a parking range (P-range) or the other range (NotP-range). An engagement part 23a is defined at a tip end of the detent spring 23. When the engagement part 23a fits into a P-range concave 24 of the detent lever 15, the detent lever 15 is maintained in the P-range position. When the engagement part 23a fits into a NotP-range concave 25 of the detent lever 15, the detent lever 15 is maintained in the NotP-range position.

Figure 4:
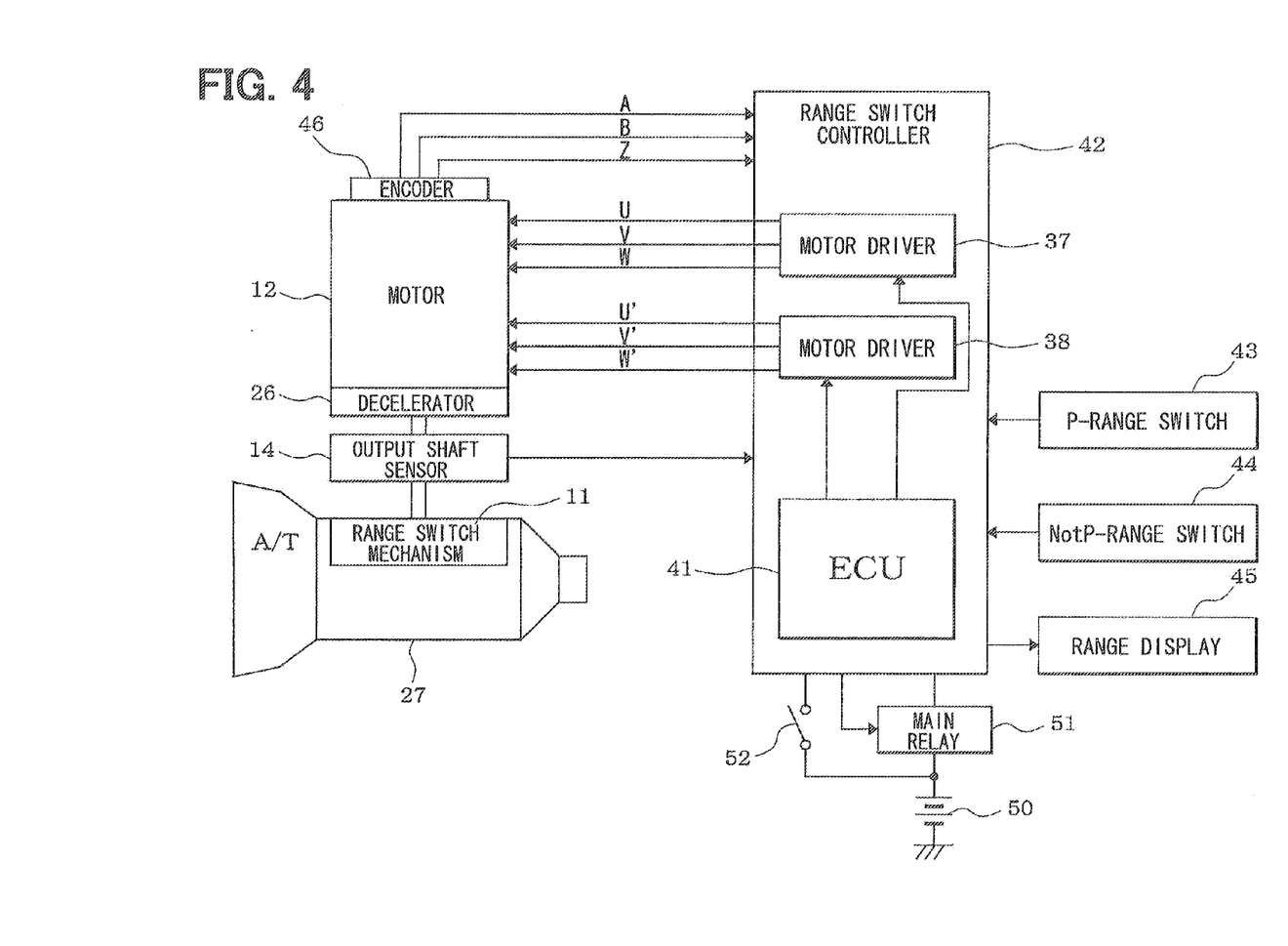
FIG. 4 is a block diagram illustrating the range switch device.

When the P-range is set, the parking rod 18 is moved in a direction approaching the lock lever 21, and a thick portion of the cone 19 pushes up the lock lever 21. A convex 21a of the lock lever 21 fits into the parking gear 20, thereby the parking gear 20 is locked. Thus, the output shaft of the automatic shift 27 is locked, and the driving wheel is locked. That is, the park state is maintained.

In contrast, when the NotP-range is set, the parking rod 18 is moved in a direction separating from the lock lever 21, and the thick portion of the cone 19 is separated from the lock lever 21, thereby the lock lever 21 is lowered. The convex 21a of the lock lever 21 is separated from the parking gear 20, thereby the parking gear 20 is unlocked. Thus, the output shaft of the automatic shift 27 becomes rotatable. That is, the vehicle is allowed to drive.

The output shaft sensor 14 is a rotation sensor such as potentiometer to output a voltage corresponding to a rotation angle of the output shaft 13 of the decelerator mechanism 26 of the motor 12. The present range can be confirmed to be the P-range or NotP-range based on the output voltage.

Figure 2:
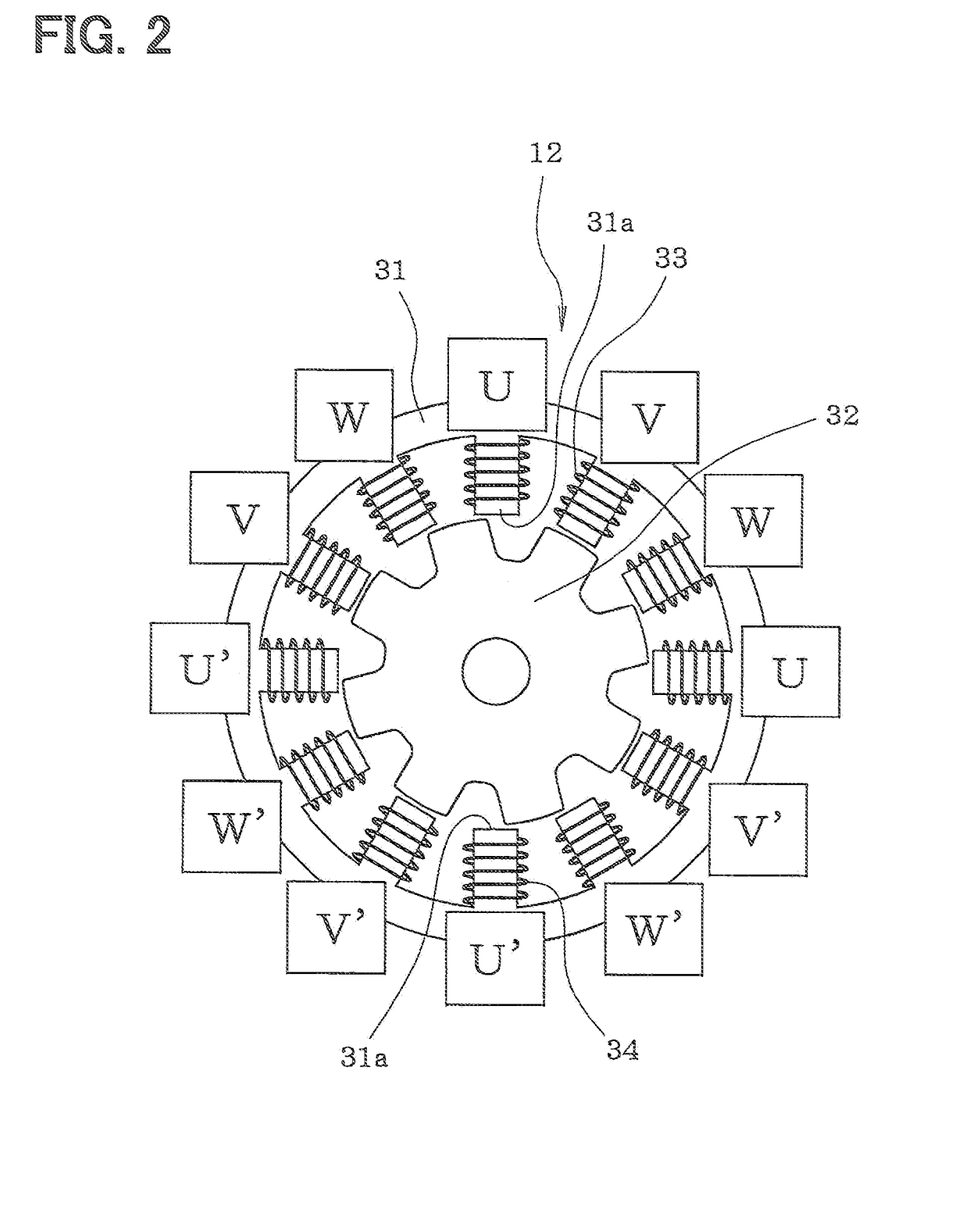
FIG. 2 is a view illustrating a motor of the range switch device.

The motor 12 will be described with reference to FIG. 2. In the first embodiment, a switched reluctance (SR) motor is used as the motor 12. Poles of a stator 31 and a rotor 32 of the motor 12 have protruding structure. A permanent magnet is unnecessary in the motor 12, so that the motor 12 has simple structure.

For example, twelve protruding poles 31a are arranged on an inner circumference of the cylindrical stator 31 at equal intervals, and eight protruding poles 32a are arranged on an outer circumference of the rotor 32 at equal intervals.

When the rotor 32 is rotated, each pole 32a of the rotor 32 sequentially opposes to the poles 31a of the stator 31 through a minute gap. U-phase, V-phase or W-phase six winding wires 33 are would around six of the poles 31a of the stator 31, respectively. U'-phase, V'-phase or W'-phase six winding wires 34 are wound around the other six of the poles 31a of the stator 31, respectively. The number of the poles 31a, 32a may be changed suitably.

Figure 3:
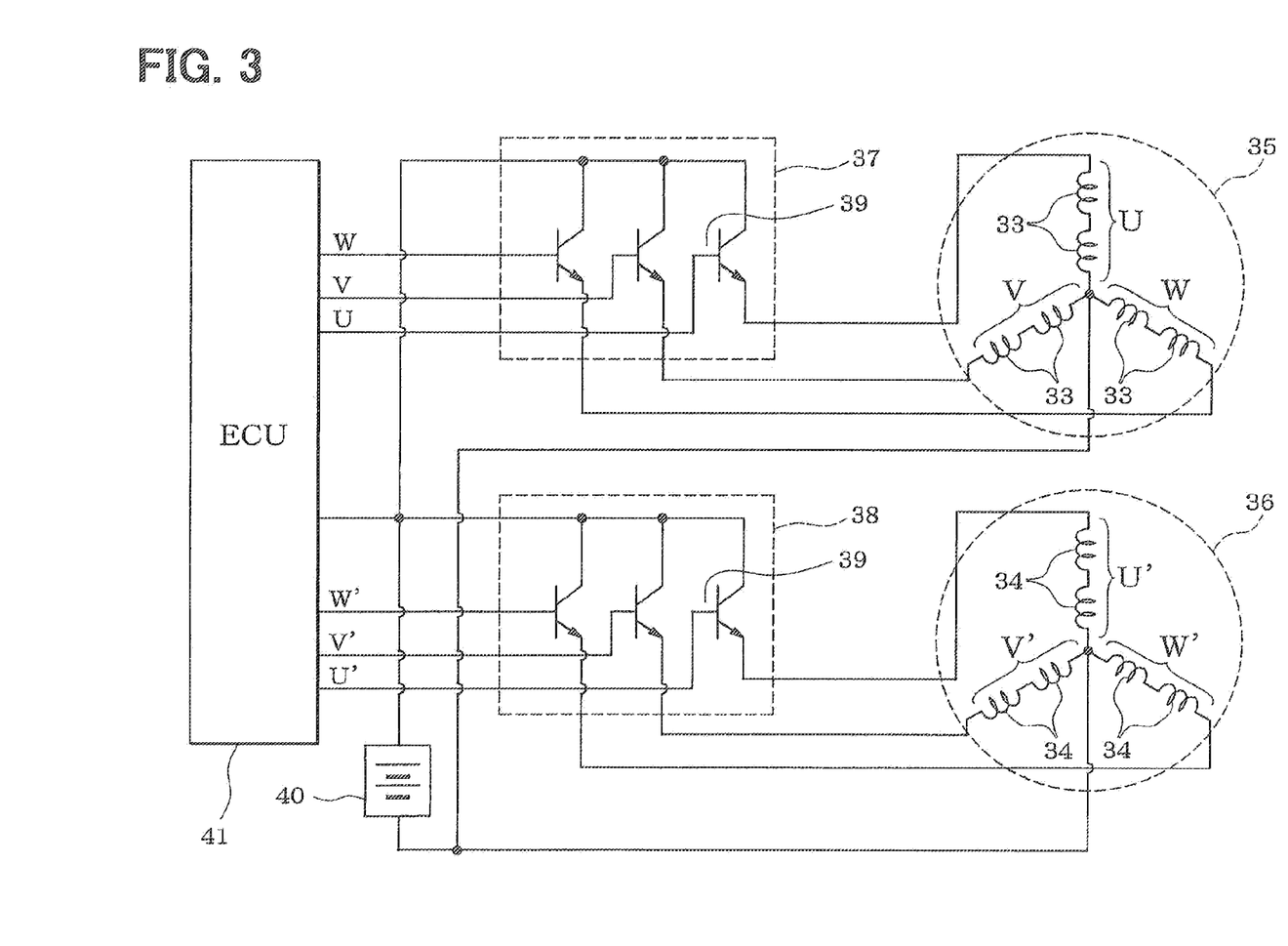
FIG. 3 is a circuit diagram of the motor.

The winding wire 33, 34 has a winding order of the V-phase, W-phase, U-phase, V-phase, W-phase, U-phase, V'-phase, W'-phase, U'-phase, V'-phase, W'-phase and U'-phase, for example, relative to the twelve poles 31a of the stator 31. As shown in FIG. 3, a motor magnetization part 35 is constructed by the U-phase, V-phase or W-phase six winding wires 33, and a motor magnetization part 36 is constructed by the U'-phase, V'-phase or W'-phase six winding wires 34.

The motor magnetization part 35 is defined by Y-connection of the six U-phase, V-phase or W-phase winding wires 33. Two of the winding wires 33 having the same phase are connected in series. The motor magnetization part 36 is defined by Y'-connection of the U'-phase, V'-phase or W'-phase six winding wires 34. Two of the winding wires 34 having the same phase are connected in series.

Electricity is simultaneously supplied to the U-phase and the U'-phase of the motor magnetization parts 35, 36. Electricity is simultaneously supplied to the V-phase and the V'-phase of the motor magnetization parts 35, 36. Electricity is simultaneously supplied to the W-phase and the W-phase of the motor magnetization parts 35, 36.

The motor magnetization part 35 is driven by a motor driver 37 using an on-vehicle battery 40 as a power source. The motor magnetization part 36 is driven by a motor driver 38 different from the motor driver 37 using the on-vehicle battery 40 as a power source. A set of the motor magnetization part 36 and the motor driver 38 is prepared separately from a set of the motor magnetization part 35 and the motor driver 37 as other system. Even if one of the systems breaks down, the motor 12 can be rotated by the other system. In an example of FIG. 3, a switching element 39 such as transistor is provided for each phase, so that circuit construction has a unipolar drive system. Alternatively, two switching elements may be provided for each phase, so that circuit construction has a bi-polar drive system. One of the sets of the motor magnetization part and the motor driver may be eliminated.

The switching element 39 of the motor driver 37, 38 is turned on/off by an electronic control unit 41 (ECU). As shown in FIG. 4, the ECU 41 and the motor driver 37, 38 are mounted in a range switch controller 42 corresponding to a motor controlling device. A signal is output from a P-range switch 43 into the controller 42 when the P-range switch 43 is operated to set the P-range. A signal is output from a NotP-range switch 44 into the controller 42 when the NotP-range switch 44 is operated to set the NotP-range. A range selected through the P-range switch 43 or NotP-range switch 44 is displayed on a range display 45 arranged in an instrument panel (not shown).

Power is supplied to the range switch controller 42 from an on-vehicle battery 50 through a main relay 51 corresponding to a power switch. The main relay 51 is turned on/off by turning on/off an ignition switch 52. If the ignition switch 52 is turned on, the main relay 51 is turned on, and power is supplied to the range switch controller 42. If the ignition switch 52 is turned off, the main relay 51 is turned off after a predetermined period, and the power supplying is stopped. The predetermined period is necessary for performing a finishing process of each control program.

Figure 5:
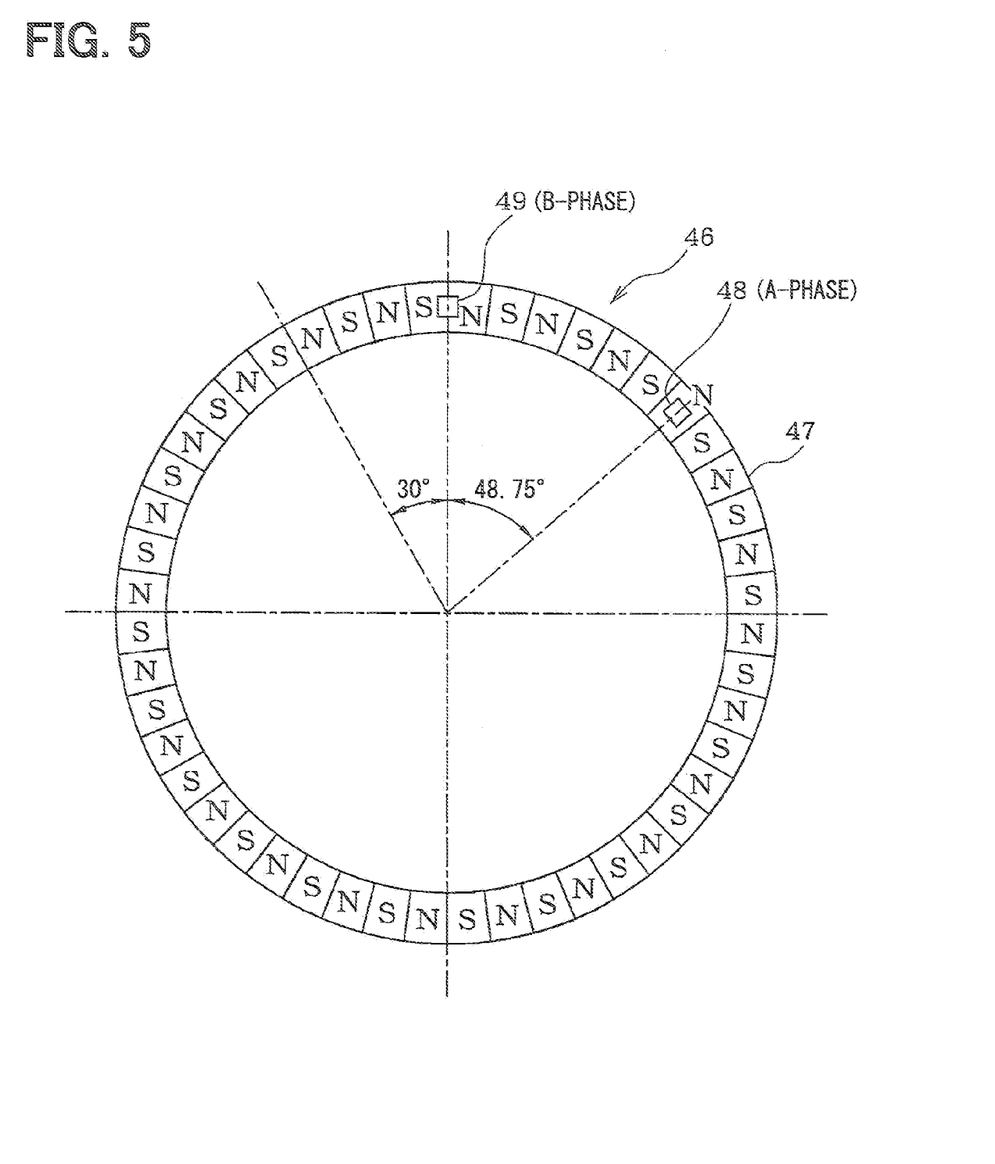
FIG. 5 is a plan view illustrating a rotary magnet of an encoder of the motor.
Figure 6:
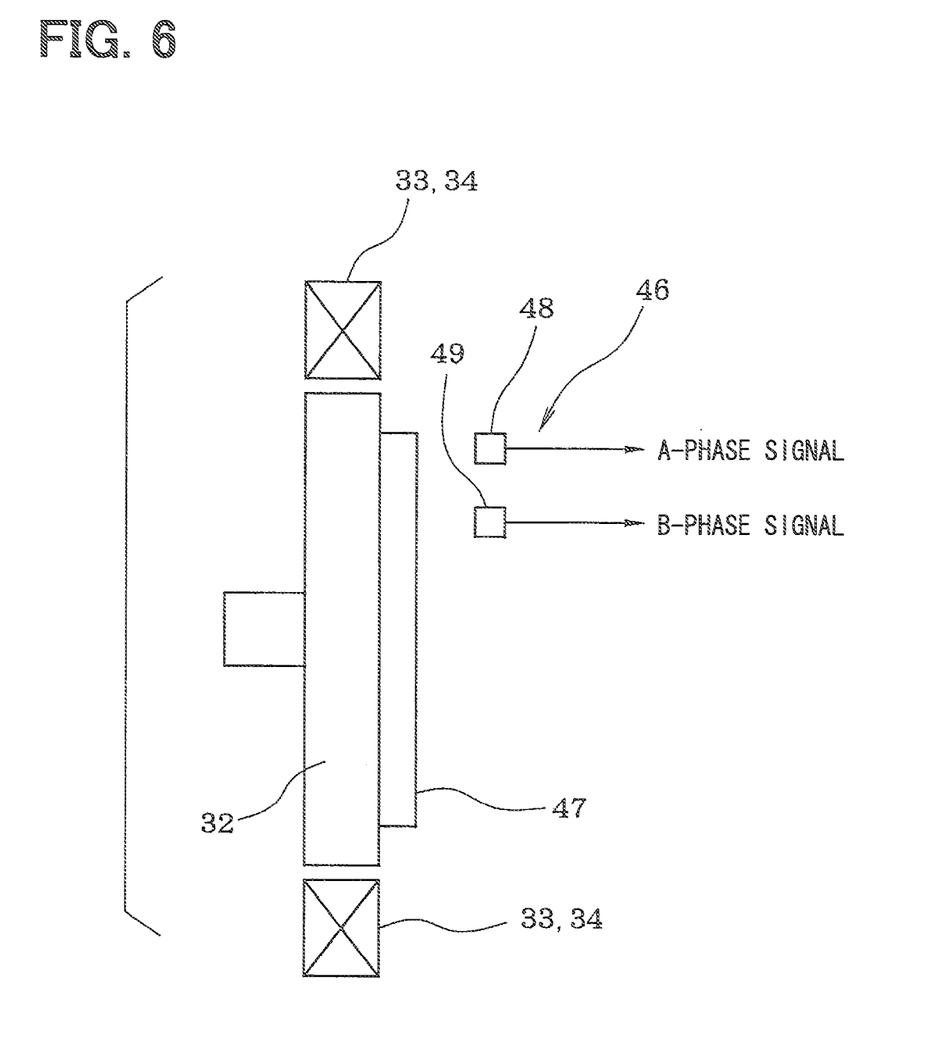
FIG. 6 is a side view illustrating the encoder.

The motor 12 has an encoder 46 to detect a rotation position of the rotor 32. The encoder 46 may be a magnetic rotary encoder, for example. Specifically, as shown in FIG. 5, a circular rotary magnet 47 alternately has N-poles and S-poles in even pitch in a circumference direction. As shown in FIG. 6, the magnet 47 is fixed to a side face of the rotor 32 with the same center axis. Two magnetism detecting elements 48, 49 are arranged to oppose to the rotary magnet 47, as shown in FIGS. 5 and 6. The detecting element 48, 49 may be made of a hole IC.

A magnetic pitch between the N-pole and the S-pole of the rotary magnet 47 is set as 7.5°, for example, so as to correspond to a rotation angle of the rotor 32 generated when the motor 12 has one magnetization. If the energized phase of the motor 12 is switched 6-time by single-to-double phase magnetization system, the energized phase is switched round in order, so that the rotor 32 and the rotary magnet 47 are integrally rotated by 45° (=7.5°×6). The total number of the N-poles and the S-poles located in a range of the rotation angle 45° of the rotary magnet 47 is six.

The following position relationship is defined between the rotary magnet 47 and the magnetism detecting element 48, 49. The magnetism detecting element 48 outputs an A-phase signal, and the magnetism detecting element 49 outputs a B-phase signal. The elements 48, 49 are located on the same circumference line able to oppose to the magnetized portion (N, S) of the rotary magnet 47.

Figure 7A:
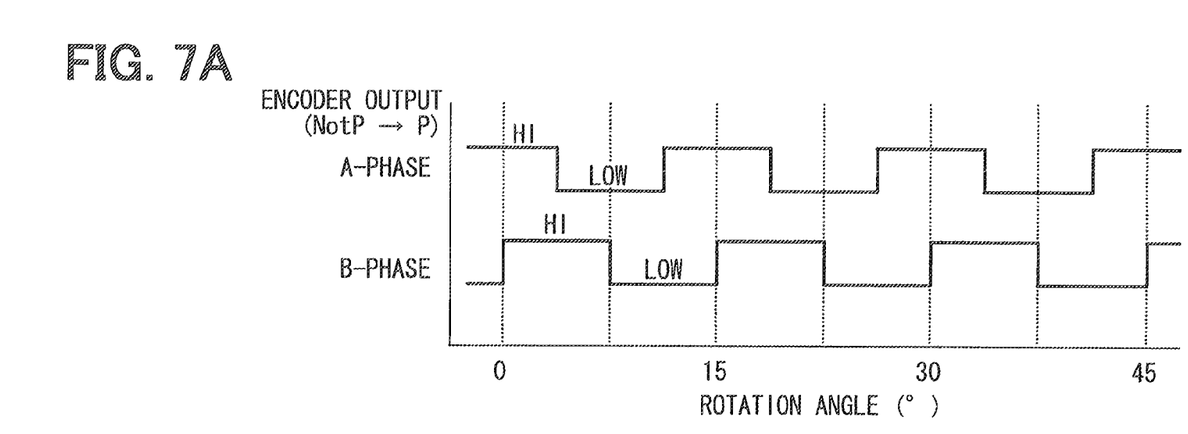
FIG. 7A is a graph illustrating a relationship between a waveform output from the encoder and a rotation angle of a rotor of the motor.

As shown in FIG. 7A, an interval between the elements 48, 49 is set in a manner that the A-phase signal and the B-phase signal have a phase difference of 90° in electrical angle, which corresponds to 3.75° in machine angle. The electrical angle is an angle calculated when a generation period of the A or B phase signal is defined as one period (360°). The machine angle is a mechanical angle calculated when one rotation of the rotor 32 is defined as 360°.

A rotation angle of the rotor 32 rotated in a period from a transition of the A-phase signal to a transition of the B phase-signal corresponds to the machine angle of the phase difference between the A-phase signal and the B-phase signal. An output of the element 48, 49 becomes high "1" when the element 48, 49 opposes to the N-pole (N'-pole), and the output of the element 48, 49 becomes low "0" when the element 48, 49 opposes to the S-pole (S'-pole).

The ECU 41 counts rising/falling edges of both of the A-phase signal and the B-phase signal, and switches the energized phase of the motor 12 based on the count value, thereby the rotor 32 is rotated. At this time, a rotation direction of the rotor 32 is judged by the generation order of the A-phase signal and the B-phase signal. The count value is counted up in a positive rotation direction defined from the P-range to the NotP-range. The count value is counted down in a negative rotation direction defined from the NotP-range to the P-range.

Therefore, a relationship between the count value of the encoder 46 and the rotation position of the rotor 32 is maintained if the rotor 32 is rotated in the positive/negative direction. The rotation position corresponding to the rotation angle of the rotor 32 can be detected based on the count value for both of the positive/negative rotation. The rotor 32 is driven to rotate by supplying electricity to the winding wire 33, 34 having a phase corresponding to the rotation position.

Figure 7B:
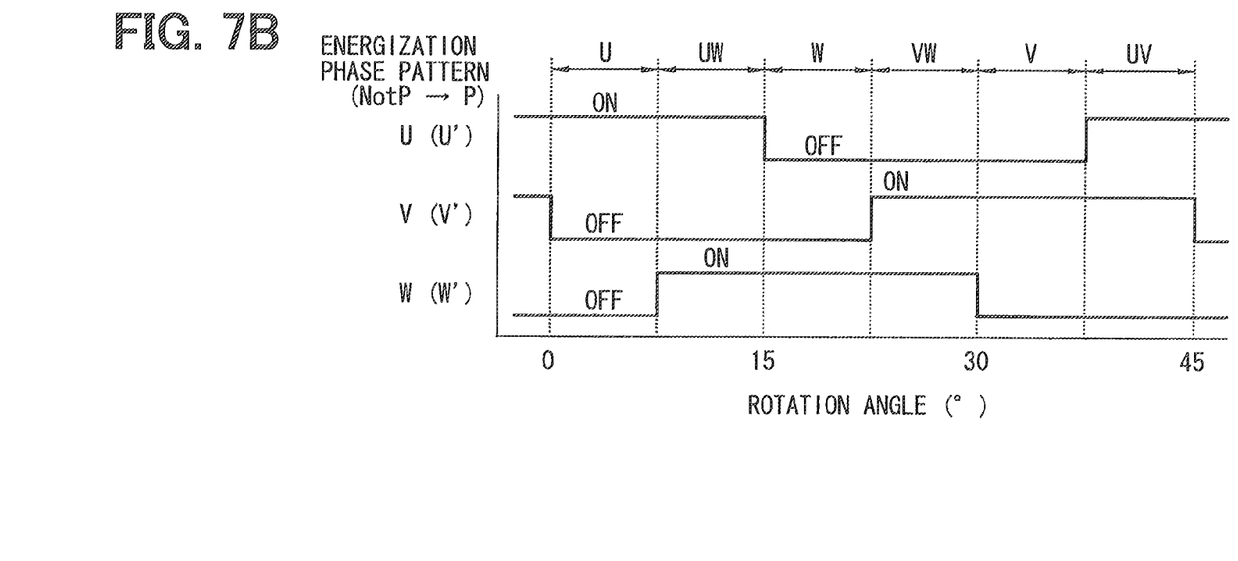
FIG. 7B is a graph illustrating a relationship between an energized phase switch pattern and a rotation angle of the rotor.

FIG. 7A shows a waveform output from the encoder 46, and FIG. 7B shows a switch pattern of the energized phase, when the rotor 32 is rotated in the negative direction from the NotP-range to the P-range. In both of the negative direction rotation and the positive direction rotation, single-phase energization and double-phase energization are alternately switched whenever the rotor 32 has a rotation of 7.5°. While the rotor 32 has a rotation of 45°, the energized phase is switched round in order of the U-phase, UW-phase, W-phase, VW-phase, V-phase and UV-phase, for example.

The rotor 32 has a rotation of 7.5° every time when the energized phase is switched. The magnetic pole of the rotary magnet 47 opposing to the magnetism detecting element 48, 49 is changed between the N-pole and the S-pole (N'-pole and S'-pole). Level of the A-phase signal and level of the B-phase signal are alternately reversed. Therefore, whenever the rotor 32 has a rotation of 7.5°, the count value is counted up or down by 2. The A-phase signal is output when the A-phase signal becomes high "1", and the B-phase signal is output when the B-phase signal becomes high "1".

A memory of the count value is vanished when a power source of the ECU 41 is turned off, because the count value is memorized in a RAM of the ECU 41. Therefore, immediately after the power source of the ECU 41 is turned on, the count value is 0, so that the count value does not correspond to an actual rotation position of the rotor 32 or the energized phase of the motor 12. That is, it is necessary to make the count value to correspond to the actual rotation position of the rotor 32 and the energized phase of the motor 12 after the motor 12 is activated. Thus, the energized phase can be switched based on the count value.

In the first embodiment, the ECU 41 of the range switch controller 42 sequentially switches the energized phase of the motor 12 with a predetermined time schedule, while an initial drive is performed after the ECU 41 is turned on. The edges of the A-phase signal and the B-phase signal output from the encoder 46 are counted, and the ECU 41 learns the relationship among the count value of the encoder 46, the rotation position of the rotor 32 and the energized phase of the motor 12 when the initial drive is finished. When a normal drive mode is selected after the initial drive, the ECU 41 sets the energized phase based on the count value and the learned result obtained when the initial drive is ended. The ECU 41 may correspond to an initial drive controlling portion to control the initial drive.

Figure 8:
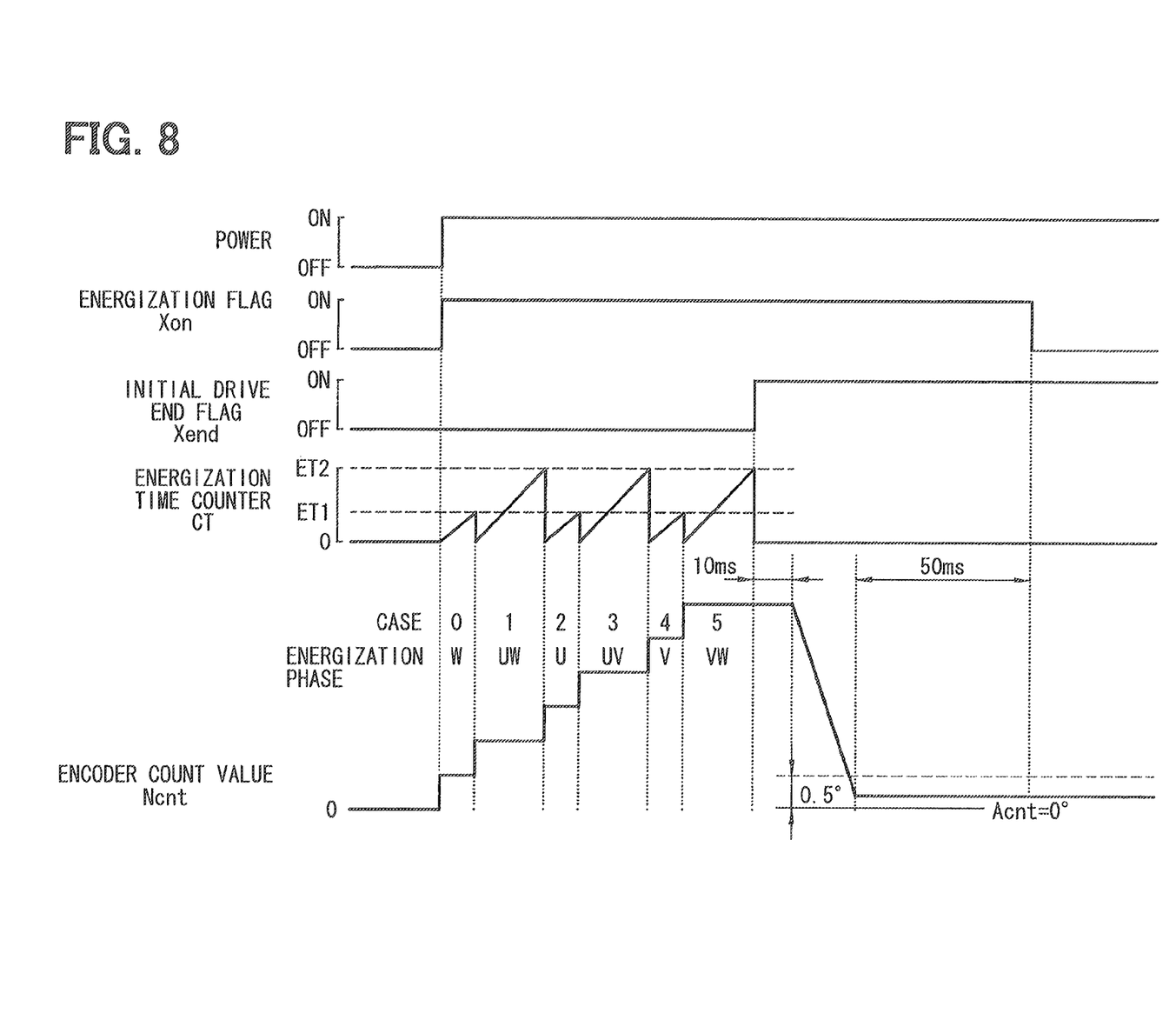
FIG. 8 is a time chart when an initial drive is performed for the motor in a case where a P-range is set by the range switch device.

Specifically, as shown in FIG. 8, in a case where the initial drive is performed when the ECU 41 is turned on in a state that the P-range is set, the energized phase is switched, round in order of the W, UW, U, UV, V and VW phases with a predetermined time schedule. Thus, the rotor 32 is driven in the positive rotation direction from the P-range to the NotP-range.

In contrast, if the initial drive is performed in a state that the NotP-range is set, the energized phase is switched round in order of the V, UV, U, UW, W and VW phases with a predetermined time schedule. Thus, the rotor 32 is driven in the negative rotation direction from the NotP-range to the P-range.

In the initial drive, a time ET1 of the single-phase energization is made shorter than a time ET2 of the double-phase energization. For example, the time ET1 is set as 10 ms, and the time ET2 is set as 100 ms. Even after synchronization can be achieved between the rotation position of the rotor 32 and the energized phase during the initial drive, the time ET1 of the single-phase energization is made shorter, because the rotor 32 is vibrated during the single-phase energization having a small torque. The vibration of the rotor 32 can be promptly stopped by switching from the single-phase energization to the double-phase energization. Thus, the output signal of the encoder 46 can be made stable.

If the energized phase is switched round in the initial drive, the rotation position of the rotor 32 can correspond to one of the energized phases before the initial drive is ended. After that, the rotor 32 is rotated by synchronizing with the switch of the energized phase. Further, the A-phase signal and the B-phase signal are output from the encoder 46 in a state of synchronizing with the rotation of the rotor 32.

During the initial drive, the rising/falling edges of both of the A-phase signal and the B-phase signal are counted by the encoder 46. Therefore, an actual rotation angle of the rotor 32 synchronizing with the switch of the energized phase can be detected based on the count value when the initial drive is ended. Thus, the relationship among the count value, the rotation position of the rotor 32, and the energized phase can be detected when the initial drive is ended.

In an example of FIG. 8 showing the initial drive, the rotor 32 starts rotation with the first energized phase (W-phase). Every time when the energized phase is switched, the rotor 32 has a rotation of 7.5°, and the count value is counted up by 2. The count value becomes 12 when the initial drive is ended.

In contrast, if the rotor 32 is not rotated by the first three magnetizations of the W, UW and U phases, for example, that is if the rotor 32 is rotated in synchronization with the latter three magnetizations of UV, V and VW phases, the rotor 32 has a rotation of 22.5° (=7.5°×3) and the count value becomes 6 (=2×3) when the initial drive is ended. Therefore, the actual rotation angle of the rotor 32 synchronizing with the switch of the energized phase can be detected based on the count value when the initial drive is ended.

The last energized phase of the initial drive is always the VW-phase, but the last count value is not limited to 12, for example, may be 8 or 4. When a usual drive mode is selected after the initial drive is ended, the energized phase is set based on the count value. Therefore, the energized phase can be properly selected in the usual drive mode by correcting an error of the count value in the initial drive.

A usual motor control is performed after the initial drive is ended. As shown in FIG. 8, electricity is supplied for 10 ms, for example, to the VW phase, which is the same phase as the energized phase selected when the initial drive is ended. Thus, the position of the rotor 32 is held at the same position as that when the initial drive is ended. Then, the energized phase is switched using feedback control based on the present time encoder count value and the learned error of the initial position, so that the rotor 32 is rotated in a direction approaching a target position Acnt.

When the rotation position of the rotor 32 corresponding to the count value becomes in a range within 0.5° from the target position Acnt, the switch of the energized phase is ended, so that the rotor 32 is stopped. After that, the electricity supply is continued for the same energized phase, so that the rotor 32 is maintained to be stopped, for example, for 50 ms. Then, if the target position Acnt is not changed, the electricity supply is stopped.

It is necessary to continue the electricity supply to the motor 12 during the initial drive. Therefore, the motor 12 emits much heat. Usually, the initial drive is performed only once because the motor 12 is not turned off for a while after the motor 12 is activated. However, if a user repeatedly turns on and off the ignition switch 52 for fun, the initial drive is repeatedly performed. In this case, the motor 12 may be damaged, or a life of the motor 12 may become short, because a temperature of the motor 12 is unexpectedly raised.

In the first embodiment, the initial drive is prohibited from being restarted until a predetermined prohibition time is elapsed after the initial drive is ended. Even if a user repeatedly turns on and off the switch 52 for fun, the initial drive is prevented from being performed repeatedly.

The prohibition period is set to be equal to or longer than a period necessary for lowering the temperature of the motor 12 or the encoder 46 than a predetermined temperature, while the temperature is raised by heat of the motor 12 in the initial drive. This prohibition period may be a fixed one, or may be changed in accordance with the temperature of the motor 12, for example. The temperature of the motor 12 may be detected by a temperature sensor, or may be presumed based on current amount passing through the motor 12 in the initial drive.

Further, in the first embodiment, even if the ignition switch 52 is turned off within the prohibition period after the initial drive is ended, the main relay 51 is not turned off. That is, the power supply to the range switch controller 42 is continued. Thus, even if an operation for stopping the power supply is performed within the prohibition period after the initial drive is ended, the power supply is continued until the prohibition period is elapsed, so that values learned by the initial drive can be maintained. Therefore, if the power supply is restarted in the prohibition period, a normal motor control can be immediately started without performing the initial drive.

Figure 9:
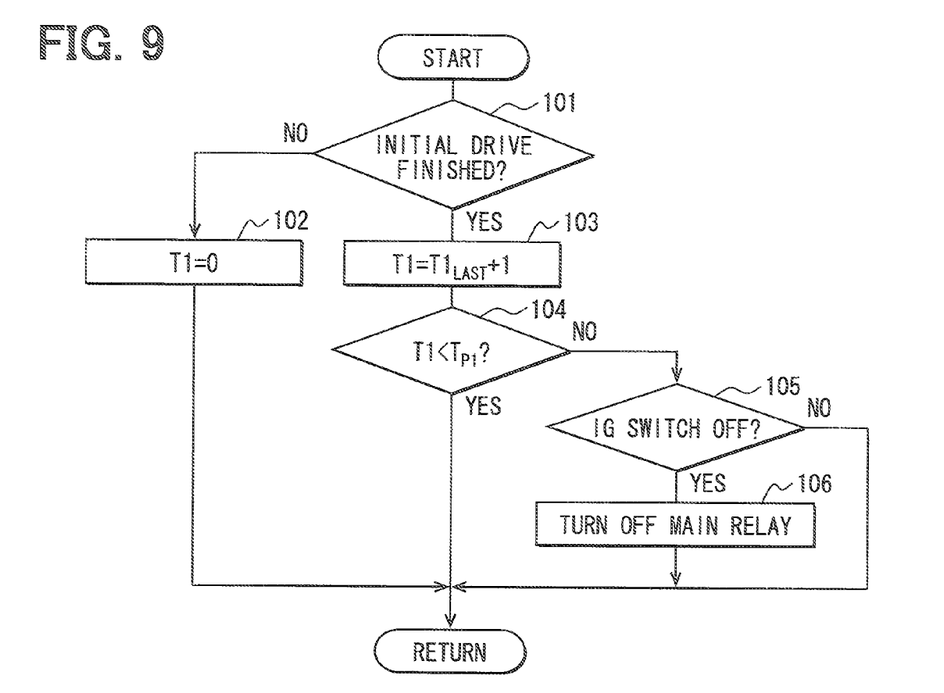
FIG. 9 is a flow chart illustrating a processing performed when an operation for stopping power supplying is performed.

The above control is performed by the ECU 41 of the range switch controller 42 in accordance with a control routine of FIG. 9. This routine is repeatedly performed with a given period while power is supplied to the range switch controller 42. The routine may correspond to an initial drive prohibiting portion.

The routine is defined for when an operation for stopping the power supply is performed. The initial drive is determined to be finished or not at S101. If the initial drive is determined not to be finished at S101, a count value T1 of an elapsed-time counter to count time elapsed after the initial drive is ended is maintained as "0" or the count value T1 is cleared at S102, and the routine is returned to S101.

If the initial drive is determined to be finished at S101, the count value T1 of the elapsed-time counter is counted up by one from a last value of $T1_{LAST}$ at S103 in the counting of the elapsed-time. Then, the count value T1 of the elapsed-time counter is determined whether to be less than a specified value $T_{P1}$ corresponding to the prohibition period at S104.

If the count value T1 of the elapsed-time counter is less than the specified value $T_{P1}$ at S104, the prohibition period is determined to be continued. That is, the initial drive is prohibited from being performed within the prohibition period.

If the count value T1 of the elapsed-time counter is determined to be equal to or higher than the specified value $T_{P1}$ at S104, the prohibition period is determined to be elapsed after the initial drive is ended. At this time, the ignition switch 52 is determined to be turned off or not at S105. If the ignition switch 52 is not turned off, this routine will be ended.

If the ignition switch 52 is determined to be turned off at S105, the main relay 51 is turned off at S106, thereby the power supply to the range switch controller 42 is stopped, and this routine is ended.

According to the first embodiment, the initial drive is prohibited from being performed until the predetermined prohibition time is elapsed after the initial drive is ended. Even if a user repeatedly turns on and off the motor 12 for fun, the initial drive is prevented from being performed repeatedly. Therefore, the motor 12 can be restricted from being damaged, and the life of the motor 12 can be maintained to be long, because the temperature of the motor 12 is restricted from being unexpectedly raised.

Further, even if an operation for stopping the power supply is performed within the prohibition period after the initial drive is ended, the power supply is continued until the prohibition period is elapsed, so that values learned by the initial drive can be maintained. If an operation for restarting the power supply is performed in the prohibition period, a normal motor control can be immediately started without performing the initial drive.

Second Embodiment

Figure 10:
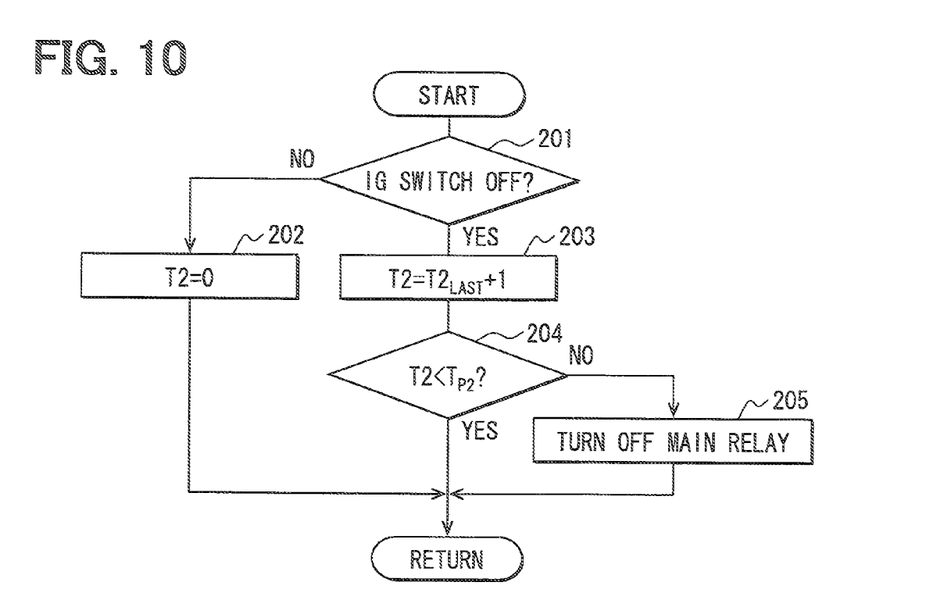
FIG. 10 is a flow chart illustrating a processing performed when an operation for stopping power supplying is performed for a range switch device according to a second embodiment.

The initial drive is prohibited until the predetermined prohibition period is elapsed after the initial drive is ended, in the first embodiment. In a second embodiment, a control routine of FIG. 10 is performed. In FIG. 10, when an operation for stopping the power supply is performed for the range switch controller 42, that is when the ignition switch 52 is turned off, the power supply is continued by maintaining the main relay 51 ON until a predetermined prohibition period is elapsed. Other matters in the second embodiment are approximately the same as the first embodiment.

The control routine of the second embodiment will be described with reference to FIG. 10. This routine is repeatedly performed by the ECU 41 with a given period while power is supplied to the range switch controller 42. The routine may correspond to a power source controlling portion.

When this routine is started, the ignition switch 52 is determined to be turned off or not at S201. If the ignition switch 52 is not turned off, a count value T2 of an elapsed-time counter to count time elapsed after the switch 52 is turned off is maintained as "0" or the count value T2 may be cleared at S202. Then, this routine will be ended.

If the ignition switch 52 is determined to be turned off at S201, the count value T2 of the elapsed-time counter is counted up from a last value of $T2_{LAST}$ by one at S203, so as to count the elapsed-time after the switch 52 is turned off. Then, the count value T2 of the elapsed-time counter is determined to be less than a specified value $T_{P2}$ corresponding to the prohibition period, at S204. If the count value T2 of the elapsed-time counter is less than the specified value $T_{P2}$, the prohibition period is determined to be continued, so that the power supply is prohibited from being stopped, and this routine is ended.

If the count value T2 of the elapsed-time counter is determined to equal to or higher than the specified value $T_{P2}$ at S204, the prohibition period is determined to be elapsed after the switch 52 is turned off, so that the main relay 51 is turned off at S205. That is, the power supply to the range switch controller 42 is stopped, and this routine is ended.

According to the second embodiment, even when an operation for stopping the power supply to the range switch controller 42 is performed, the power supply is continued through the main relay 51 until the predetermined prohibition period is elapsed. Therefore, the power supply is continued until the prohibition period is elapsed even after the operation for stopping the power supply is performed, so that values learned by the initial drive can be maintained. Therefore, if an operation for restarting the power supply is performed in the prohibition period, a normal motor control can be immediately started without performing the initial drive. Even if a user repeatedly turns on and off the motor 12 for fun, the initial drive is prevented from being performed repeatedly. Therefore, the motor 12 can be restricted from being damaged, and the life of the motor 12 may be maintained long, because the temperature of the motor 12 is restricted from being unexpectedly raised.

If the operation for stopping the power supply is performed in the initial drive, the initial drive is continued in the prohibition period, because the power supply is continued for the prohibition period. If the operation for restarting the power supply is restarted within the prohibition period after the initial drive is ended, a normal motor control is immediately started without performing the initial drive.

The encoder 46 is not limited to the magnetic encoder. For example, an optical encoder or a brush-type encoder may be used as the encoder 46.

The SR motor is used as the motor 12 in the embodiments. However, the motor 12 is not limited to the SR motor. Alternatively, other kinds of brushless synchronous motor may be used as the motor 12, if the energized phase of the motor is sequentially changed by detecting the rotation position of the rotor based on the count value output from the encoder.

The range switch device switches the range of the automatic shift between two, that is P-range and NotP-range. The range switch device may switch the range of the automatic shift among P, R, N, D, etc., by switching a range switch valve and a manual valve in response to an operation of the detent lever 15.

The motor controlling device is not limited to be used for the range switch device. The motor controlling device may be used in various kinds of position switch device including brushless synchronous motor such as SR motor as a drive source.

Such changes and modifications are to be understood as being within the scope of the present invention as defined by the appended claims.

What is claimed is:

1. A motor controlling device comprising:
a motor having a rotor;
an encoder to output pulse signals with a predetermined angle interval as the rotor is rotated, an energized phase of the motor being sequentially switched so as to drive the rotor by detecting a rotation position of the rotor based on a value of counting the signals output from the encoder;
an initial drive controlling portion to execute an initial drive to switch the energized phase with a predetermined pattern after the motor is activated so as to learn a relationship among the count value, the rotation position and the energized phase; and
an initial drive prohibiting portion to prohibit the execution of the initial drive until a predetermined prohibition time is elapsed after the initial drive is finished.

2. The motor controlling device according to claim 1, wherein
the predetermined prohibition time is set equal to or larger than a period necessary for lowering a temperature of the motor or the encoder than a predetermined temperature after the temperature is raised by heat of the motor during the initial drive.

3. The motor controlling device according to claim 1, wherein
the initial drive prohibiting portion continues power supplying for the motor while an operation for stopping the power supplying is performed in the predetermined prohibition time after the initial drive is finished.

4. The motor controlling device according to claim 3, further comprising:
a power switch through which power is supplied for the motor from a power source; and
an ignition switch to receive the operation for stopping the power supplying, wherein
the power switch is prohibited from being turned off during the prohibition period if the ignition switch receives the operation for stopping the power supplying.

5. The motor controlling device according to claim 1, wherein
the predetermined prohibition time is variable in accordance with the temperature of the motor.

6. A motor controlling device comprising:
a motor having a rotor;
an encoder to output pulse signals with a predetermined angle interval as the rotor is rotated, an energized phase of the motor being sequentially switched by detecting a rotation position of the rotor based on a value of counting the signals output from the encoder so as to drive the rotor;
an initial drive controlling portion to execute an initial drive to switch the energized phase with a predetermined pattern after the motor is activated so as to learn a relationship among the count value, the rotation position and the energized phase; and
a power source controlling portion to continue power supplying for the motor until a predetermined time is elapsed if an operation for stopping the power supplying is performed.

7. The motor controlling device according to claim 6, further comprising:
- a power switch through which power is supplied for the motor from a power source; and
  - an ignition switch to receive the operation for stopping the power supplying, wherein
- the power switch is prohibited from being turned off within the predetermined time if the ignition switch receives the operation for stopping the power supplying.

8. The motor controlling device according to claim 6, further comprising:
- a normal control instructing portion to start a normal control, wherein
- the initial drive controlling portion learns a relationship among the count value, the rotation position and the energized phase to obtain a learning value provided by the initial drive,
- the power source controlling portion continues power supplying for the motor and maintains the learning value provided by the initial drive until a predetermined time is elapsed if an operation for stopping the power supplying is performed, and
- the normal control instructing portion starts a normal control based on the learning value without performing the initial drive when the power supplying is restarted in the predetermined prohibition time.

9. A motor controlling device comprising:
- a motor having a rotor;
- an encoder to output pulse signals with a predetermined angle interval as the rotor is rotated, an energized phase of the motor being sequentially switched so as to drive the rotor by detecting a rotation position of the rotor based on a value of counting the signals output from the encoder;
- an initial drive controlling portion to execute an initial drive to switch the energized phase with a predetermined pattern after the motor is activated and to learn a relationship among the count value, the rotation position and the energized phase to obtain a learning value provided by the initial drive; and
- an initial drive prohibiting portion to prohibit the execution of the initial drive until a predetermined prohibition time is elapsed after the initial drive is finished, wherein
- the initial drive prohibiting portion continues power supplying for the motor and maintains the learning value provided by the initial drive while an operation for stopping the power supplying is performed in the predetermined prohibition time after the initial drive is finished, and
- the initial drive prohibiting portion starts a normal control based on the learning value without performing the initial drive when the power supplying is restarted in the predetermined prohibition time.

* * * * *